(12) United States Patent
Denner et al.

(10) Patent No.: US 9,819,534 B2
(45) Date of Patent: *Nov. 14, 2017

(54) WIRELESSLY SYNCING CONTENT OF AN APPLICATION WITHOUT REQUIRING DEVICE TO BE PLUGGED INTO POWER SOURCE

(71) Applicant: International Business Machines Corporation, Armonk, NY (US)

(72) Inventors: Gary Denner, Longwood (IE); Patrick J. O'Sullivan, Dublin (IE); Kevin G. Paterson, San Antonio, TX (US)

(73) Assignee: International Business Machines Corporation, Armonk, NY (US)

( * ) Notice: Subject to any disclaimer, the term of this patent is extended or adjusted under 35 U.S.C. 154(b) by 570 days.

This patent is subject to a terminal disclaimer.

(21) Appl. No.: 13/915,766

(22) Filed: Jun. 12, 2013

(65) Prior Publication Data

US 2014/0365603 A1 Dec. 11, 2014

Related U.S. Application Data

(63) Continuation of application No. 13/914,746, filed on Jun. 11, 2013.

(51) Int. Cl.
*G06F 15/16* (2006.01)
*H04L 12/24* (2006.01)
(Continued)

(52) U.S. Cl.
CPC .............. *H04L 41/00* (2013.01); *H04L 43/00* (2013.01); *H04L 67/1095* (2013.01); *H04W 4/00* (2013.01)

(58) Field of Classification Search
None
See application file for complete search history.

(56) References Cited

U.S. PATENT DOCUMENTS 5,414,861 A 5/1995 Horning
5,517,640 A * 5/1996 Tsuchiya ........... G06F 17/30395
(Continued)

FOREIGN PATENT DOCUMENTS

CN 1679002 A 10/2005
CN 101146285 A 3/2008
CN 101611364 A 12/2009

OTHER PUBLICATIONS

Office Action for U.S. Appl. No. 13/914,746 dated Jul. 22, 2015, pp. 1-21.
(Continued)

*Primary Examiner* — Lance Leonard Barry
*Assistant Examiner* — Mohammad Yousuf A Mian
(74) *Attorney, Agent, or Firm* — Robert A. Voigt, Jr.; Winstead, P.C.

(57) ABSTRACT

A method, system and computer program product for wirelessly syncing content. An analytics engine in a mobile computing device gathers and stores information regarding battery usage for data synchronizations. Upon receiving an indication for content of an application to be synced with the device, the analytics engine determines an estimated amount of content to be synced as well as an estimated amount of battery usage for syncing the estimated amount of content based on the stored information. The content will be wirelessly synced with the device if there is sufficient battery life for syncing the content. If there is not enough battery life for wirelessly syncing the entire content, then a portion of the content will be synced. In this manner, the device does not need to be plugged into a power source and will only sync the amount of content that the device has power to do so.

8 Claims, 4 Drawing Sheets

(51) Int. Cl.
*H04L 12/26* (2006.01)
*H04L 29/08* (2006.01)
*H04W 4/00* (2009.01)

(56) References Cited

U.S. PATENT DOCUMENTS

| | | | |
|---|---|---|---|
| 5,845,142 | A | 12/1998 | Hayasaka |
| 6,470,358 | B1 * | 10/2002 | Beyda ............... G06F 17/30147 |
| 6,880,051 | B2 | 4/2005 | Timpanaro-Perrotta |
| 7,069,457 | B2 * | 6/2006 | Marshall ............ H04L 67/1095 |
| | | | 707/999.202 |
| 7,522,685 | B2 | 4/2009 | Zakrewski |
| 7,809,384 | B2 | 10/2010 | Vargas et al. |
| 8,751,845 | B2 * | 6/2014 | Assad ................... G06F 1/3212 |
| | | | 713/300 |
| 2005/0147130 | A1 * | 7/2005 | Hurwitz ............ G06F 17/30578 |
| | | | 370/503 |
| 2008/0200220 | A1 * | 8/2008 | Jackson ................ G06F 1/3203 |
| | | | 455/574 |
| 2009/0307376 | A1 | 12/2009 | McCarthy et al. |
| 2010/0262582 | A1 * | 10/2010 | Garcia-Ascanio |
| | | | ........................ G06F 17/30174 |
| | | | 707/634 |
| 2012/0317432 | A1 | 12/2012 | Assad et al. |

OTHER PUBLICATIONS

Office Action for U.S. Appl. No. 13/914,746 dated Jan. 4, 2016, pp. 1-27.
Office Action for U.S. Appl. No. 13/914,746 dated Dec. 15, 2016, pp. 1-24.

* cited by examiner

WIRELESSLY SYNCING CONTENT OF AN APPLICATION WITHOUT REQUIRING DEVICE TO BE PLUGGED INTO POWER SOURCE

CROSS-REFERENCE TO RELATED APPLICATIONS

The present application is a continuation application of pending U.S. patent application Ser. No. 13/914,746, which was filed on Jun. 11, 2013, which is assigned to the assignee of the present invention. The present application claims priority benefits to U.S. patent application Ser. No. 13/914,746.

TECHNICAL FIELD

The present invention relates generally to content synchronization, and more particularly to wirelessly syncing the content of an application without requiring the computing device to be plugged into a power source.

BACKGROUND

Today, users may often use multiple computing devices, such as mobile computing devices and desktop computing devices. In addition, such users may utilize multiple instances of an application on these computing devices. For example, instances of a media library application (e.g., iTunes®) may be loaded onto a tablet computer, a smartphone and a desktop computer. In this way, the user may have access to the same application and/or application data on multiple devices.

As a result of having multiple instances of an application on multiple devices, the content of the application on each device needs to be synchronized in order for the user to be provided with a seamless and consistent experience. That is, the content for each of the instances of the application needs to be synchronized in order for each application to perform consistently regardless of which device the user is using. For example, if content has been added, deleted or updated for one of the instances of the application, then such content needs to be synchronized with the other instances of the application.

Currently, a computing device (e.g., smartphone) can be wirelessly synced with another computing device (e.g., desktop computer) in order to synchronize the content. However, the computing device (e.g., smartphone) is required to be plugged into a power source in order to be wirelessly synced with the other computing device. The computing device is required to be plugged into a power source in order to wirelessly sync content as the computing device can end up in a "bad" state if power disappears during the synchronization of the content. However, since the computing device is required to be plugged into a power source, it would not be much of an issue to also use a sync cable to synchronize data contained on these two devices. Hence, the benefit of wirelessly syncing content between two devices is greatly lessened.

Furthermore, a power cable may easily become disconnected with the computing device, such as by accidentally tripping over the cable or picking up a mobile computing device to check the status of the synchronization causing the power cable to be unplugged from the power source. Furthermore, a power outage may occur. Hence, the computing device may still end up in a "bad" state even if the computing device was originally plugged into a power source.

As a result, the requirement of connecting the computing device to a power source in order to wirelessly sync content has many drawbacks.

BRIEF SUMMARY

In one embodiment of the present invention, a method for wirelessly syncing content comprises gathering and storing information regarding battery usage for data synchronizations with a device. The method further comprises receiving an indication for content of an application to be synced with the device. Additionally, the method comprises determining an estimated amount of content of the application to be synced as well as an estimated amount of battery usage for syncing the estimated amount of content of the application with the device based on the stored information. In addition, the method comprises syncing, by a processor, the content of the application with the device in response to a battery life of the device exceeding the estimated amount of battery usage for syncing the content of the application with the device.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for wirelessly syncing content. In one embodiment of the present invention, an analytics engine in a mobile computing device gathers and stores information regarding battery usage for data synchronizations with the device. For example, the analytics engine may generate distribution curves based on battery usage for synchronizing particular types of data (e.g., songs, videos, e-mail). Furthermore, the analytics engine may generate a table indicating an average amount of content that is synced for each application (e.g., a media application as opposed to an e-mail application). Upon receiving an indication for content of an application to be synced with the device, the analytics engine determines an estimated amount of content of the application to be synced as well as an estimated amount of battery usage for syncing the estimated amount of content of the application with the device based on the stored information. The content of the application will be synced with the device if the battery life of the device exceeds the estimated amount of battery life for syncing the content of the application with the device. If there is not enough battery life for wirelessly syncing the entire content, then a portion of the content, such as data that is rated with a high prioritization, will be synced. Later, after the computing device has increased its battery life, the data that is rated with a low prioritization can be synced. In this manner, the computing device does not need to be plugged into a power source and will only sync the amount of content that the computing device has power to do so. As a result, the computing device will not enter a "bad" state since power should not disappear during the synchronization of the content.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
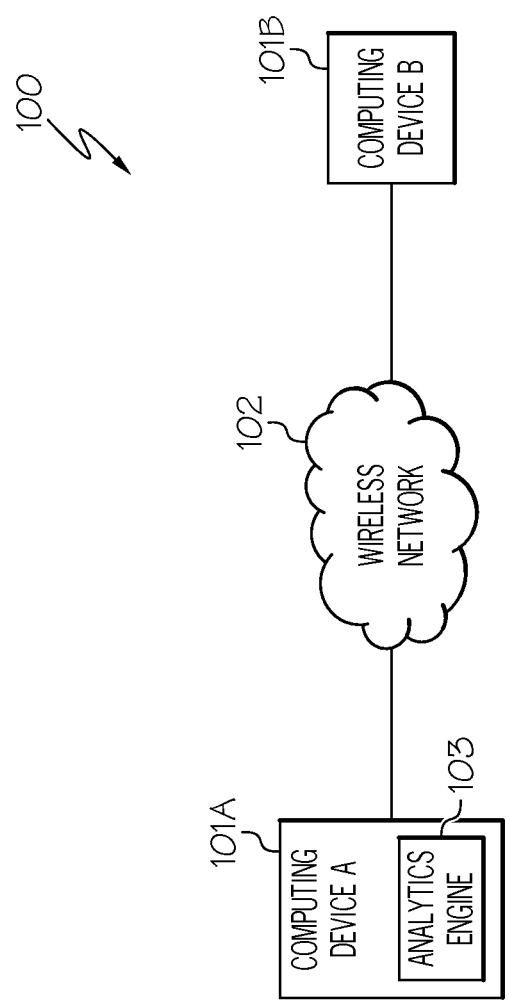
FIG. 1 illustrates a network system configured in accordance with an embodiment of the present invention.

Referring now to the Figures in detail, FIG. 1 illustrates a network system 100 for practicing the principles of the present invention in accordance with an embodiment of the present invention. Network system 100 includes computing device 101A (identified as "Computing Device A") wirelessly synchronizing content of an application with computing device 101B (identified as "Computing Device B") via a wireless network 102. Computing devices 101A-101B may collectively or individually be referred to as computing devices 101 or computing device 101, respectively. Computing device 101A may be any type of mobile computing device (e.g., portable computing unit, Personal Digital Assistant (PDA), smartphone, laptop computer, mobile phone, navigation device, game console, Internet appliance and the like) configured with the capability of wirelessly connecting to network 102 and consequently communicating with computing device 101B to synchronize the content of an application. Computing device 101B may be any type of computing device (e.g., portable computing unit, Personal Digital Assistant (PDA), smartphone, laptop computer, mobile phone, navigation device, game console, desktop computer system, workstation, Internet appliance and the like) configured with the capability of wirelessly connecting to network 102 and consequently communicating with computing device 101A. A description of the hardware configuration of computing device 101 is provided below in connection with FIG. 2.

Computing device 101A includes an analytics engine 103 configured to wirelessly sync the content of an application with another computing device 101B without requiring computing device 101A to be plugged into a power source. Analytics engine 103 ensures that there is enough power to wirelessly sync the content of an application by determining an estimated amount of battery usage for syncing the content. If there is not enough battery life for wirelessly syncing the entire content, then a portion of the content, such as data that is rated with a high prioritization, will be synced. Later, after computing device 101A has increased its battery life, the data that is rated with a low prioritization can be synced. In this manner, computing device 101A does not need to be plugged into a power source and will only sync the amount of content that computing device 101A has power to do so. As a result, computing device 101A will not enter a "bad" state since power should not disappear during the synchronization of the content. A further description of the functionality of analytics engine 103 is provided below in connection with FIGS. 3A-3B.

Wireless network 102 may be, for example, a wireless local area network, a wireless wide area network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Figure 2:
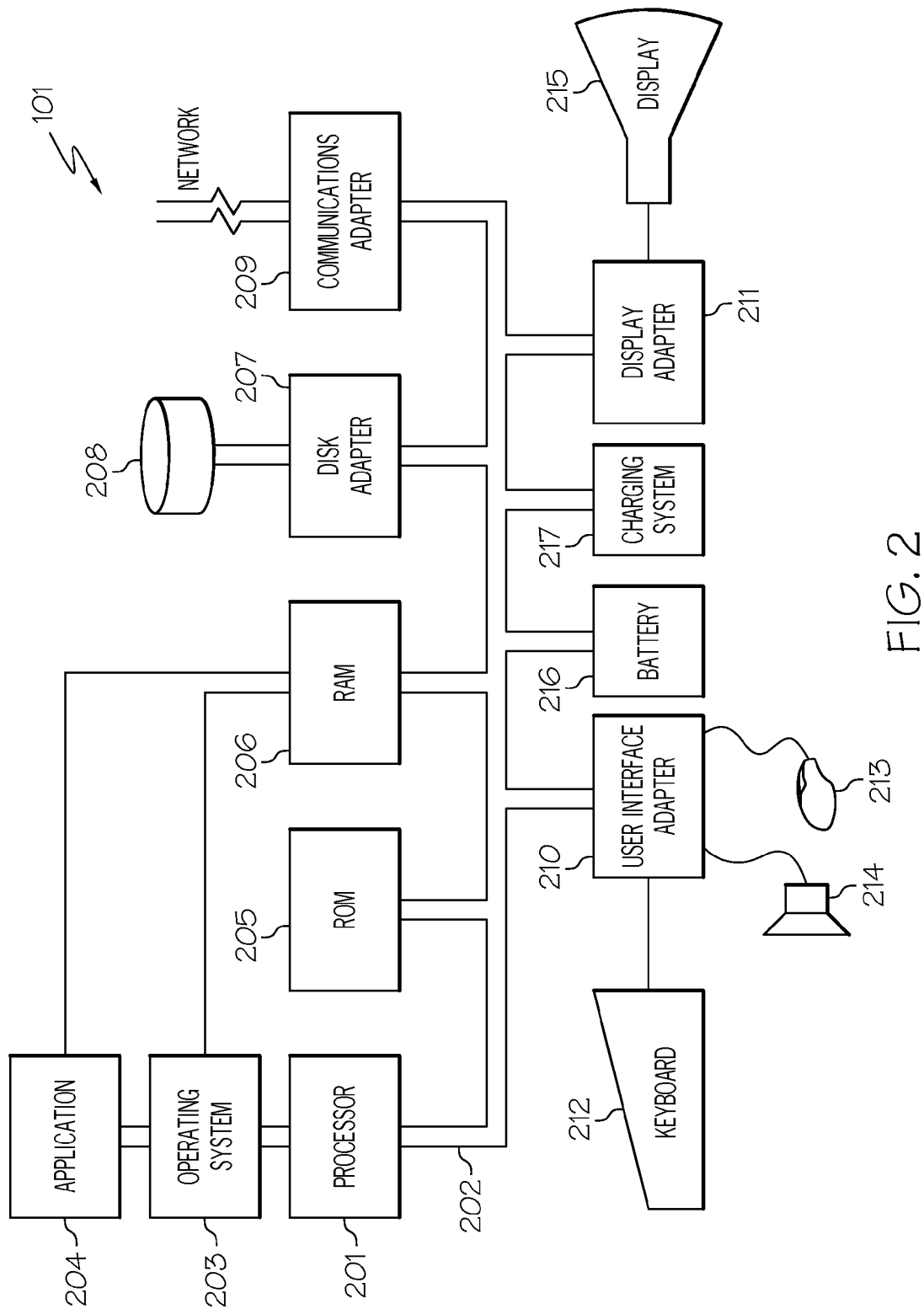
FIG. 2 illustrates a hardware configuration of a computing device configured in accordance with an embodiment of the present invention.

Referring now to FIG. 2, FIG. 2 illustrates a hardware configuration of computing device 101 (e.g., computing device 101A of FIG. 1) which is representative of a hardware environment for practicing the present invention. Referring to FIG. 2, computing device 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 of computing device 101A may include, for example, analytics engine 103 of FIG. 1 for wirelessly syncing the content of an application as discussed further below in association with FIGS. 3A-3B. In one embodiment, analytics engine 103 may be a copy on computing device 101 that is periodically updated from a copy that resides in a cloud computing environment.

Referring again to FIG. 2, read-only memory ("ROM") 205 is coupled to system bus 202 and includes a basic input/output system ("BIOS") that controls certain basic functions of computing device 101. Random access memory ("RAM") 206 and disk adapter 207 are also coupled to system bus 202. It should be noted that software components including operating system 203 and application 204 may be loaded into RAM 206, which may be computing device's 101 main memory for execution. Disk adapter 207 may be an integrated drive electronics ("IDE") adapter that communicates with a disk unit 208, e.g., disk drive.

Computing device 101 may further include a communications adapter 209 coupled to bus 202. Communications adapter 209 interconnects bus 202 with an outside network (e.g., network 102 of FIG. 1) thereby enabling computing device 101 to communicate with other computing devices 101.

I/O devices may also be connected to computing device 101 via a user interface adapter 210 and a display adapter 211. Keyboard 212, mouse 213 and speaker 214 may all be interconnected to bus 202 through user interface adapter 210. A display monitor 215 may be connected to system bus 202 by display adapter 211. In this manner, a user is capable of inputting to computing device 101 through keyboard 212 or mouse 213 and receiving output from computing device 101 via display 215 or speaker 214.

Furthermore, computing device 101, such as computing device 101A, may further include a battery 216 and a charging system 217 to charge battery 216. Battery 216 may be charged through a transformer and power cord or through a host device or through a docking station. In the cases of the docking station, the charging may be transmitted through electrical ports or possibly through an inductance charging means that does not require a physical electrical connection to be made.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, currently, a computing device (e.g., smartphone) can be wirelessly synced with another computing device (e.g., desktop computer) in order to synchronize content that has been added, deleted or updated. However, the computing device (e.g., smartphone) is required to be plugged into a power source in order to be wirelessly synced with the other computing device. The computing device is required to be plugged into a power source in order to wirelessly sync content as the computing device can end up in a "bad" state if power disappears during the synchronization of the content. However, since the computing device is required to be plugged into a power source, it would not be much of an issue to also use a sync cable to synchronize data contained on these two devices. Hence, the benefit of wirelessly syncing content between two devices is greatly lessened. Furthermore, a power cable may easily become disconnected with the computing device, such as by accidentally tripping over the cable or picking up a mobile computing device to check the status of the synchronization causing the power cable to be unplugged from the power source. Furthermore, a power outage may occur. Hence, the computing device may still end up in a "bad" state even if the computing device was originally plugged into a power source. As a result, the requirement of connecting the computing device to a power source in order to wirelessly sync content has many drawbacks.

The principles of the present invention provide a means for synchronizing content without requiring the computing device to be plugged into a power source as discussed further below in connection with FIGS. 3A-3B.

Figure 3A:
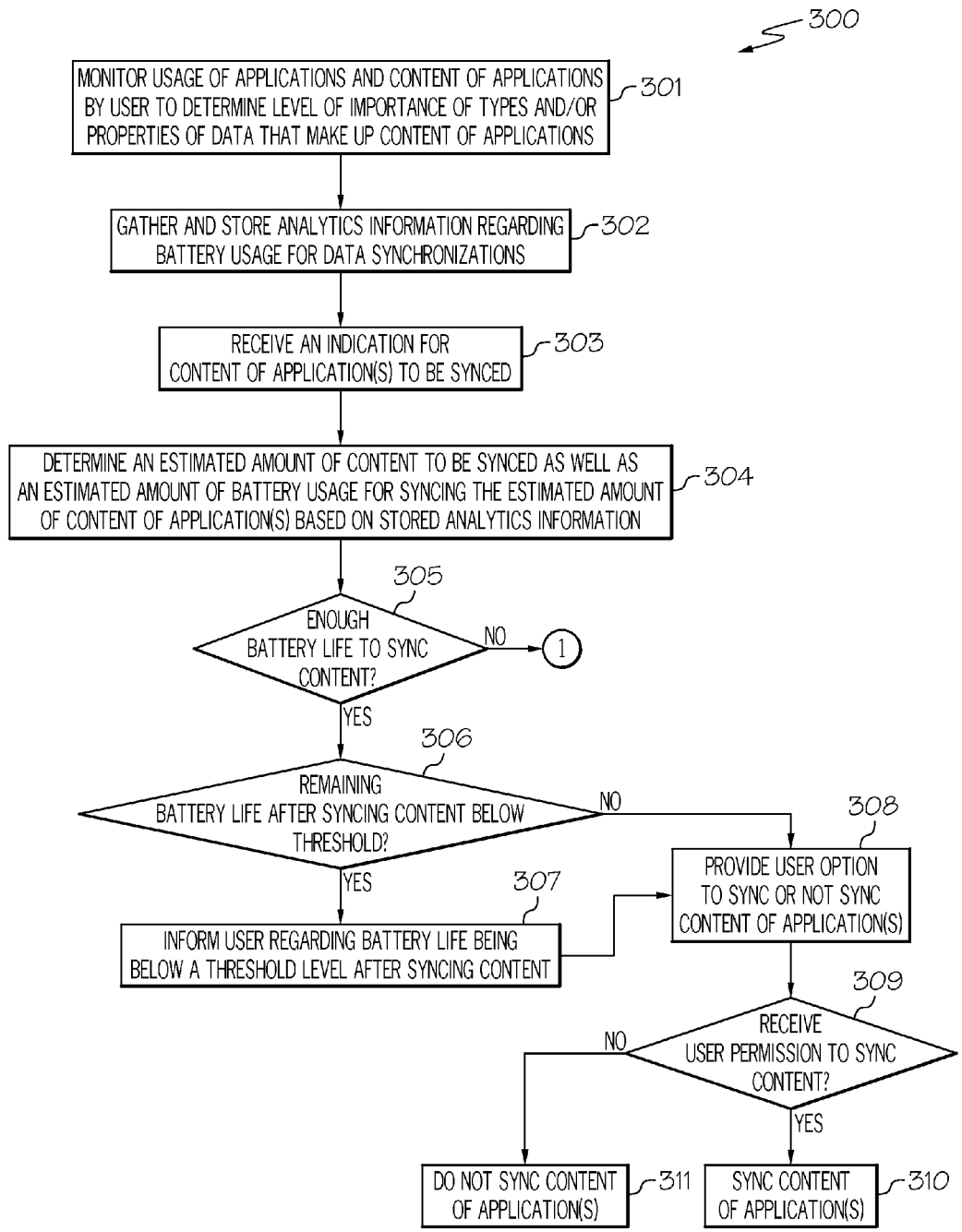
FIGS. 3A-3B are a flowchart of a method for wirelessly synchronizing content without requiring the computing device to be plugged into a power source in accordance with an embodiment of the present invention.
Figure 3B:
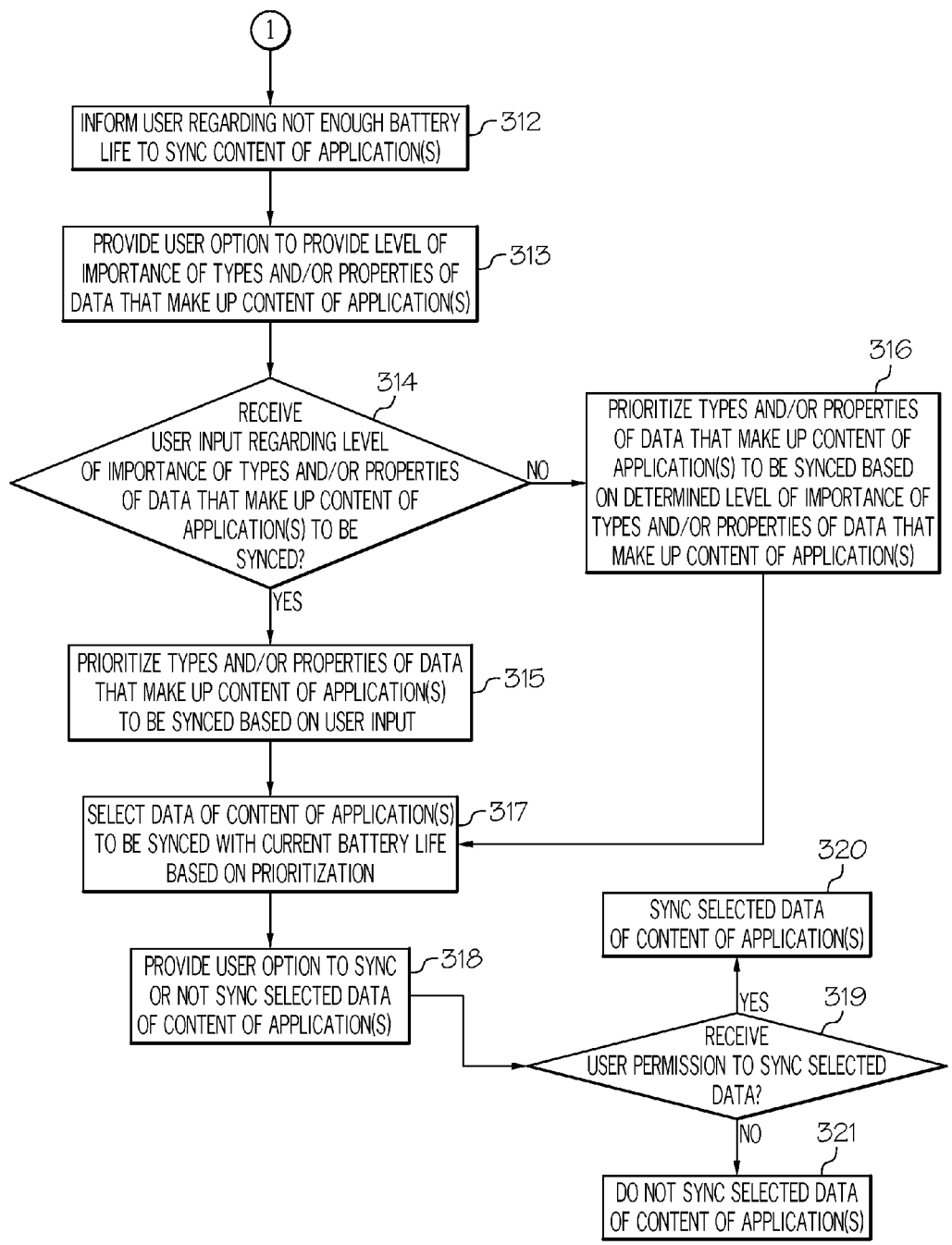

FIGS. 3A-3B are a flowchart of a method 300 for wirelessly synchronizing content without requiring computing device 101 (e.g., computing device 101A) to be plugged into a power source in accordance with an embodiment of the present invention.

Referring to FIG. 3A, in conjunction with FIGS. 1-2, in step 301, analytics engine 103 of computing device 101A monitors the usage of the applications and the content of the applications by a user of computing device 101A to determine a level of importance of the types (e.g., audio, video) and/or properties (e.g., sales deals that exceed $100,000) of the data that make up the content of the applications. For example, new songs and new videos may represent a higher priority than updates for an e-mail application based on the user's usage of media applications (e.g., user is constantly viewing, updating, etc. media applications) as opposed to the user's usage of e-mail applications (e.g., user only checks e-mail once every couple days). In another example, sales deals that exceed $100,000 may represent a higher priority as opposed to sales deals that are less than $10,000 based on the user's e-mails to the user's marketing team focusing on only those deals that exceed $100,000.

In step 302, analytics engine 103 gathers and stores information regarding battery usage for data synchronizations. In one embodiment, analytics engine 103 generates distribution curves based on battery usage for synchronizing particular types of data (e.g., songs, videos, e-mail). That is, analytics engine 103 may generate a distribution curve for each type of data that indicates an amount of battery usage for different quantities of that data based on historical synchronizations for that data. Such information may be stored in computing device 101A, such as in disk unit 208. Furthermore, analytics engine 103 may generate a table indicating an average amount of content that is synced for each application. Such a table may be stored in computing device 101A, such as in disk unit 208. For instance, analytics engine 103 of computing device 101A may track the amount of data that has been synced with computing device 101B each time a media application has been updated on computing device 101A. Analytics engine 103 may then compute the average amount of data that has been synced with computing device 101A each time the media application is updated and store such information in the table discussed above.

In step 303, analytics engine 103 receives an indication for content of an application(s) (e.g., media library application) from computing device 101B to be synced with computing device 101A.

In step 304, analytics engine 103 determines an estimated amount of content of the application(s) from computing device 101B to be synced with computing device 101A as well as an estimated amount of battery usage of the user's computing device 101A for syncing the estimated amount of content of the application(s) from computing device 101B with computing device 101A based on the stored information (information stored in step 302). For example, analytics engine 103 may consult the table indicating an average amount of content that is synced for each application to determine an estimated amount of content from these application(s) that are to be synced. Furthermore, analytics engine 103 may consult the distribution curves based on battery usage for synchronizing particular types of data (e.g., songs, videos, e-mail) to determine an estimated amount of battery usage of computing device 101A for syncing the estimated amount of content of these application(s).

In step 305, a determination is made by analytics engine 103 as to whether there is enough battery life of computing device 101A to sync the content of these application(s).

If there is enough battery life to sync the content of the application(s), then, in step 306, a determination is made by analytics engine 103 as to whether the remaining battery life of computing device 101A after syncing the content is below a threshold (e.g., 10% of battery life). In one embodiment, such a threshold is user-defined.

If the remaining battery life after syncing the content would be below a threshold (e.g., 10% of battery life), then, in step 307, analytics engine 103 informs the user of computing device 101A regarding the battery life being below a threshold level after syncing content.

In step 308, analytics engine 103 provides the user of computing device 101A an option to sync or not sync the content of the application(s).

In step 309, a determination is made by analytics engine 103 as to whether computing device 101A receives permission from the user to sync the content of the application(s).

If computing device 101A receives permission from the user to sync the content of the application(s), then, in step 310, analytics engine 103 syncs the content of the applications(s).

If, however, computing device 101A does not receive permission from the user to sync the content of the application(s), then, in step 311, analytics engine 103 does not sync the content of the applications(s).

Referring to step 306, if the remaining battery life of computing device 101A after syncing the content exceeds the threshold, then analytics engine 103 provides the user an option to sync or not sync the content of the application(s) in step 308.

Referring to step 305, if there is not enough battery life to sync the content of the application(s), then, referring to FIG. 3B, in conjunction with FIGS. 1-2, in step 312, analytics engine 103 informs the user of computing device 101A regarding there not being enough battery life to sync the content of the application(s).

In step 313, analytics engine 103 provides the user of computing device 101A an option to provide a level of importance for the types and/or properties of the data that make up the content of the application(s). For example, if the content to be synchronized relates to potential sales deals, then the sales deals with the biggest revenue impact may be rated a higher priority over those with a smaller revenue impact thereby having those sales deals with the biggest revenue impact to be synced and having those sales deals with a smaller revenue impact to be synced later after the battery life of computing device 101A has increased as discussed below.

In step 314, a determination is made by analytics engine 103 as to whether analytics engine 103 received any user input regarding the level of importance of the types and/or properties of the data that make up the content of the application(s) to be synced with computing device 101A. Referring to the example above concerning the sales deals, the user of computing device 101A may indicate that those sales deals with the biggest revenue impact are to be rated a higher priority over those with a smaller revenue impact.

If analytics engine 103 received user input regarding the level of importance of the types and/or properties of the data that make up the content of the application(s) to be synced with computing device 101, then, in step 315, analytics engine 103 prioritizes the types and/or properties of the data that make up the content of the application(s) to be synced with computing device 101A based on the user input.

If, however, analytics engine 103 did not receive user input regarding the level of importance of the types and/or properties of the data that make up the content of the application(s) to be synced with computing device 101A, then, in step 316, analytics engine 103 prioritizes the types and/or properties of the data that make up the content of the application(s) to be synced with computing device 101A based on the determined level of importance (determined in step 301 of FIG. 3A) of the types and/or properties of the data that make up the content of the application(s) to be synced with computing device 101A.

Upon prioritizing the types and/or properties of the data that make up the content of the application(s) to be synced with computing device 101A in steps 315, 316, analytics engine 103, in step 317, selects a subset of the data that make up the content of the application (e.g., selecting only those sales deals with the biggest revenue) to be synced with computing device 101A based on the determined prioritization (prioritization determined in steps 315, 316). In this manner, when there is not enough battery life for computing device 101A to wirelessly sync the entire content, computing device 101A will first sync the data that is important to the user of computing device 101A. Later, after computing device 101A has increased its battery life, the data that is rated with a low prioritization can be synced. In this manner, computing device 101A does not need to be plugged into a power source and will only sync the amount of content that computing device 101A has power to do so. As a result, computing device 101A will not enter a "bad" state since power should not disappear during the synchronization of the content.

In step 318, analytics engine 103 provides the user an option to sync or not sync the selected data of the content of the application(s).

In step 319, a determination is made by analytics engine 103 as to whether computing device 101A receives permission from the user to sync the selected data of the content of the application(s).

If computing device 101A receives permission from the user to sync the selected data of the content of the application(s), then, in step 320, analytics engine 103 syncs the selected data of the content of the application(s).

If, however, computing device 101A does not receive permission from the user to sync the selected data of the content of the application(s), then, in step 321, analytics engine 103 does not sync the selected data of the content of the application(s).

In some implementations, method 300 may include other and/or additional steps that, for clarity, are not depicted. Further, in some implementations, method 300 may be executed in a different order presented and that the order presented in the discussion of FIGS. 3A-3B is illustrative. Additionally, in some implementations, certain steps in method 300 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for wirelessly syncing content, the method comprising:
    gathering and storing information regarding battery usage for data synchronizations with a device so as to generate distribution curves based on battery usage for synchronizing particular types of data and generate tables indicating an average amount of content that is synced for each application;
    receiving an indication for content of an application to be synced with said device;
    determining an estimated amount of content of said application to be synced with said device as well as an estimated amount of battery usage for syncing said estimated amount of content of said application with said device based on said stored information by consulting said generated distribution curves and said generated tables; and
    syncing, by a processor, said content of said application with said device in response to a battery life of said device exceeding said estimated amount of battery usage for syncing said content of said application with said device.

2. The method as recited in claim 1 further comprising:
    informing a user of said device regarding a remaining battery life after syncing said content of said application being below a threshold in response to said remaining battery life after syncing said content of said application being below said threshold.

3. The method as recited in claim 2, wherein said threshold is user-defined.

4. The method as recited in claim 1 further comprising:
    monitoring usage of applications and content of applications by a user of said device to determine a level of importance of types and/or properties of data that make up said content of said applications.

5. The method as recited in claim 1 further comprising:
    prioritizing data that make up said content of said application to be synced with said device based on a determined level of importance of types and/or properties of said data that make up said content of said application; and
    selecting a subset of said data of said content of said application to be synced with said device based on said prioritization in response to said battery life of said device being less than said battery usage for syncing said content of said application with said device.

6. The method as recited in claim 5 further comprising:
    providing a user of said device an option to sync or not sync said selected data of said content of said application with said device.

7. The method as recited in claim 1 further comprising:
    receiving input from a user of said device regarding a level of importance of types and/or properties of data that make up said content of said application to be synced with said device;
    prioritizing said data of said content of said application to be synced with said device based on said user input; and
    selecting a subset of said data of said content of said application to be synced with said device based on said prioritization in response to said battery life of said device being less than said battery usage for syncing said content of said application with said device.

8. The method as recited in claim 7 further comprising:
providing said user of said device an option to sync or not sync said selected data of said content of said application with said device.

* * * * *